F. D. BALLOU.

MECHANISM FOR BOOT AND SHOE SEWING-MACHINES.

No. 6,912. Reissued Feb. 8, 1876.

WITNESSES:

Jas. C. Hutchinson

John R. Young

INVENTOR.

Francis D. Ballou, by

Prindle and Lay his Attys

UNITED STATES PATENT OFFICE.

FRANCIS D. BALLOU, OF ABINGTON, MASSACHUSETTS, ASSIGNOR, BY MESNE ASSIGNMENTS, TO FREEBORN F. RAYMOND, 2D, TRUSTEE.

IMPROVEMENT IN MECHANISMS FOR BOOT AND SHOE SEWING MACHINES.

Specification forming part of Letters Patent No. 34,203, dated January 22, 1861; reissue No. 2,906, dated March 31, 1868; reissue No. 6,912, dated February 8, 1876; application filed August 30, 1875.

*To all whom it may concern:*

Be it known that I, FRANCIS D. BALLOU, of Abington, in the county of Plymouth and State of Massachusetts, have invented certain new and useful Improvements in Sewing-Machines for Sewing on Boots and Shoes; and I do hereby declare that the following is a full, clear, and exact description of the same, reference being had to the accompanying drawings, forming a part of this specification, in which—

Figure 1:
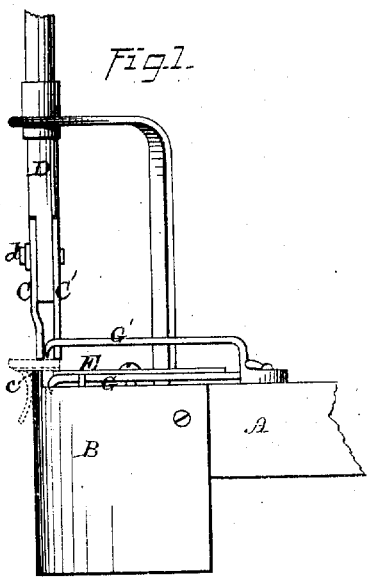
Figure 2:
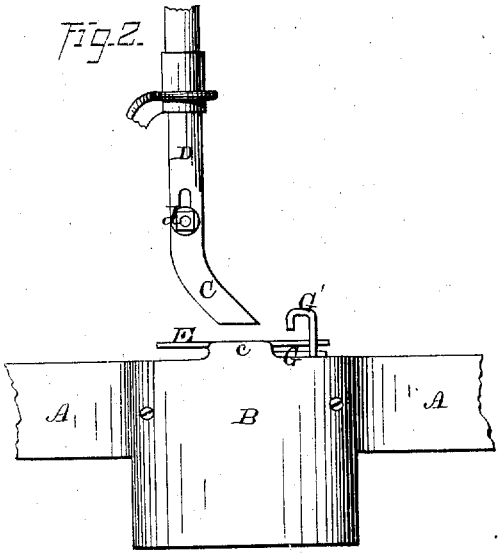
Figure 3:
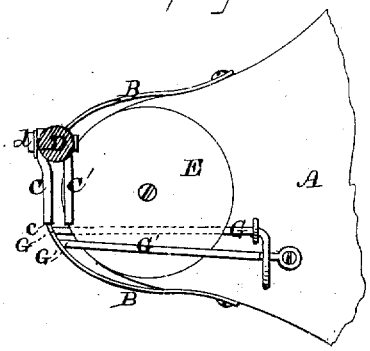

Figure 1 represents a side elevation of that part of the sewing-machine constituting my invention, showing in dotted lines a portion of the upper, outer sole, and welt in the position to be operated upon by the awl and needle when the shoe is inverted or the sole is uppermost in the machine. Fig. 2 is a front view of Fig. 1. Fig. 3 is a top view of Figs. 1 and 2, with the parts in the same relative position with each other, as in the preceding figures.

Figure 4:
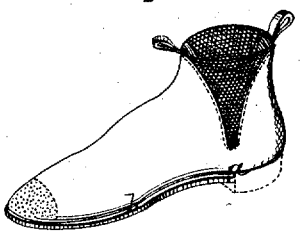
Figure 5:
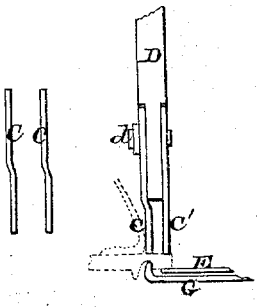

Fig. 4 represents an ordinary boot or shoe. Fig. 5 is a view of the presser-bar of Figs. 1, 2, and 3, opener and revolving disk, showing their relative position when the sole of the shoe is down or in an opposite position to that in Fig. 1.

Similar letters of reference indicate corresponding parts in the several figures above referred to.

The drawings do not represent the needle, nor the awl, nor any of the devices for forming the stitch, as the several parts to be claimed may be used with any suitable sewing mechanism for carrying wax-thread. This invention does not refer to the devices for forming any particular stitch, but to devices for presenting the work to the awl and needle in a proper manner for stitching the welt to the outer sole. This invention is also closely connected with my patent of January 10, 1860, for making sewed boots and shoes.

When the welt is stitched to the upper previously to putting on the outer sole, then the outer sole is stitched to the welt from the outside of the shoe or boot by my present improvements, and it is for the purpose of perfecting the operation of making stitched boots and shoes by my machinery.

The object of my improvements in making stitched boots or shoes by sewing mechanism is to hold the work down on the table or bed plate of the machine as near the awl and needle as possible, and to keep the channel formed on the outside of the outer sole open, so that the seam will follow closely in this channel, that the raised lip of the channel may be pressed down after the shoe is finished, and present as neat appearance as if the stitching had been done by hand. It further provides for stitching the shanks of the boot or shoe, in which operation the work can be presented to the awl and needle with great facility, and it provides for keeping the upper back from the needle, and for guiding the channel to receive the same through the machine, and for sewing light and heavy, large or small, work, all as will be hereinafter described and represented.

To enable others skilled in the art to fully understand my invention I will proceed to describe its construction and operation.

In the drawings, A represents the bed plates or table of the machine, the front end of which is curved out, as represented by the drawing, Fig. 3, for the purpose of bringing the work up close under the needle and awl (which latter parts are not shown), for stitching the shanks of the boot or shoe from the points *a* to *b* of Fig. 4. On the rounded end of table A is secured a curved plate, B, with a lip or exterior work-support, *c*, projecting up from it a suitable distance, against which exterior work-support or lip is placed the edge of the upper during the operation of sewing, in Fig. 1. This lip or outer face of the exterior work-support serves to press back the upper to prevent the awl or needle from coming in contact with it, and operates as a support to the work. The work often requires to rest upon a comparatively small surface as the stitching progresses. The curved plate or guard B is bent out from the edge of the table, forming a throat, for the purpose of allowing the awl and needle to pass freely down between this plate and table. By changing the plate B and using others of different thicknesses they may be used as gages for determining the space required between the upper leather and the row of stitching that is made through the welt and outer sole when the work is presented to the machine with the sole uppermost. Above this curved plate B, and held in suitable guides, is a vertical rod, D, which may be acted upon by a spring, if necessary, carrying on its lower end two adjustable foot-pieces, C C′, the inner one C′ being straight and parallel with the rod D, and the other one C is slightly bent inward or toward that lettered C′. These shoes are both bent forward, as clearly shown in Fig. 2, and have their lower edges parallel with the surface of table A. The shoe C is placed directly over the exterior work-support *c* of plate B, while the shoe C′ is directly over the outer edge of a revolving disk, E, as shown by Fig. 1. These two shoes, C C′, are intended to hold the work down firmly upon the movable disk E and exterior work-support *c* of plate B, so that in the upward motion of the awl and needle they will not carry the work with them. They rest on each side of the seam and press upon the welt and edge of the outer sole that projects out from the upper of the shoe. The outer shoe-plate C serves a twofold purpose, and, besides holding the work down, it is intended to gage the work, so that the awl and needle will follow in the channel previously cut near the edge of the outer sole. It thus serves to determine the space required between the upper leather and row of stitching made through the welt and outer sole when the shoe is presented to the machine with the sole down. These foot-pieces are made adjustable for the purpose of adapting the ends that rest on the work to the difference caused by the size of welt, there being much difference in the size of the welt used, and by loosening the screw *d* the pieces may be adjusted to suit any kind of work.

For different-sized shoes or boots, and when the stitching varies in its distance from the edge of the sole, or from the upper, a shoe-plate, C, of different width, may be used. The curve shown by Fig. 1 is given to this plate C, so that its lower edge may be brought as close to the upper as possible; so that the seam may have a strong hold on the welt and outer sole. In front of the shoe-plates C C′, and projecting up a suitable distance above the disk E, upon which the outer sole rests, is a pointed bar, G. In Figs. 1, 2, and 3 this point is shown turned down, but in Fig. 5 it is shown in operation, the point of which serves to open the channel that is previously cut around the outside and near the edge of the outer sole. This point is kept in such a channel, and as the work is fed up to the awl and needle the channel is opened and kept open by the said point, so that both the awl and needle will pierce the leather through this channel, and the stitches will be sunk or drawn tightly into the channel, so that when the shoe is finally stitched the lip or raised portion of the leather of the channel can be fitted down in a neat and perfect manner, as is the case of hand-stitched work. It will be seen that the opener G will further serve to guide the work up to the sewing devices. The opener should immediately precede the awl, so that the awl will descend and pierce the hole through the bottom of the channel, and not to one side and then another. This opener G is used when the welt is uppermost in the machine, and when the foot-plate C is against the upper to hold it back from the awl and needle; but when the shoe is inverted or turned over, and the sole is uppermost, an opener, G′, similar to G, and serving the same purpose, is used. The opener G is then turned down out of the way or removed from the machine. The lip exterior work-support *c* of plate B then serves to hold the upper out of the way of the awl and needle, Fig. 1, and the foot bar or rod D holds the work down on the table while the awl and needle perform their work, both of which work between the foot-plates C and C′.

The circular plate or revolving disk E serves in its relation to the above-mentioned parts to allow the work to pass freely from the awl and needle, for, as the work must be held down hard upon the table on account of its peculiar character, a fixed surface for it to pass over would cause the work to draw and twist, and it would be very difficult to control the correct line for receiving the stitch; but this revolving surface, in connection with the guides and opener, and presser foot or plates, will greatly facilitate the movement of the work up to and from the awl and needle. By using these devices with the ordinary awl-feed wax-thread sewing-machines, in which a belaying double-loop stitch is formed, the work must be reversed in some cases, so that the single thread will be in the channel of the outer sole, and the double thread or stitch on the welt. This is done for light work.

The operation of my invention may be briefly described as follows: In the operation, Fig. 5, the upper of the boot or shoe is held (commencing at the point *a*, Fig. 4) against the foot C, the outer sole resting on the lip or exterior work-support *c*, and the circular disk E, with the opener G′, placed in the channel previously cut in the outer sole. The foot-plates are adjusted by screws so as to rest on the welt. The welt and outer sole are then stitched together in the usual manner of sewing with the awl-feed wax-thread sewing-machine.

In operation, Figs. 1, 2 and 3, the upper leather of the boot or shoe is held, commencing at the heel at *a*, against the lip or exterior work-support *c*, with the welt resting on the top of this, or exterior work-support lip, and the circular plate E. The ends of the foot-plates C C′ are adjusted as required, resting on the outer sole of the shoe. The opener G is placed in the channel, as described for G, and the welt and outer sole are then stitched together in the usual manner of operating the awl-feed sewing-machines.

Having thus described my invention and improvement in wax-thread sewing-machines, what is claimed, is—

1. The combination of a guide or guard, substantially as described, with an opener for opening the channel for the action of the needle, substantially as set forth.

2. The projecting perpendicular plate B, with exterior work-support *c*, substantially as and for the purpose described.

3. In a wax-thread sewing-machine, the combination, with the presser-bar D, of the guarding and gaging presser-foot C, arranged with relation to the needle-throat, as described, whereby said presser-foot performs the triple function of holding the work firmly to the bed while the stitch is formed, of guiding the work to the action of the stitch mechanism, and of protecting the upper from perforation by the stitching mechanism, substantially as set forth.

4. In a sewing-machine for sewing the margin of shoe-soles outside the upper, the combination, with the supporting-plate A, of the exterior work-support *c* and plate B, whereby a narrow throat is formed near the edge of the machine for the operation of the stitching mechanism, substantially as set forth.

5. In a sewing-machine for stitching shoe-soles outside the uppers, the supporting-plate A, shaped and formed as described, whereby a short and narrow support for the work is formed in close proximity to the needle-throat, for the purpose set forth.

6. In a wax-thread sewing-machine, containing a sewing and feeding mechanism, working in a throat in the table-plate, the combination of a short and narrow exterior work-support *c*, located close to the needle-throat, with the table-plate A formed and shaped in the neighborhood of the needle-throat, as described, for the purposes set forth.

7. The combination of the exterior work-support *c*, with the foot-piece C, arranged substantially as described, and for the purposes set forth.

8. In a wax-thread sewing-machine, the combination of the narrow and short exterior work-support, with an upright guarding and guiding surface adjacent thereto, and with a channel-opener, all arranged in relation to each other, substantially as described.

In witness whereof I have hereto signed the foregoing specification.

FRANCIS D. BALLOU.

Witnesses:
THOS. WM. CLARKE,
F. F. RAYMOND.